US010961099B2

(12) United States Patent
Clark et al.

(10) Patent No.: US 10,961,099 B2
(45) Date of Patent: Mar. 30, 2021

(54) FLEXIBLE PLATE SCALE FOR PLATFORM LOAD WEIGHING

(71) Applicant: TEREX USA, LLC, Westport, CT (US)

(72) Inventors: Brian M Clark, Seattle, WA (US); Rainer Leuschke, Seattle, WA (US)

(73) Assignee: Terex USA, LLC, Westport, CT (US)

( * ) Notice: Subject to any disclaimer, the term of this patent is extended or adjusted under 35 U.S.C. 154(b) by 0 days.

(21) Appl. No.: 15/677,701

(22) Filed: Aug. 15, 2017

(65) Prior Publication Data
US 2018/0072550 A1 Mar. 15, 2018

Related U.S. Application Data

(60) Provisional application No. 62/385,353, filed on Sep. 9, 2016.

(51) Int. Cl.
B66F 11/04 (2006.01)
B66F 17/00 (2006.01)
G01G 19/12 (2006.01)
G01G 23/18 (2006.01)
G01G 19/52 (2006.01)
G01G 19/08 (2006.01)

(52) U.S. Cl.
CPC .......... *B66F 17/006* (2013.01); *B66F 11/044* (2013.01); *G01G 19/083* (2013.01); *G01G 19/52* (2013.01); *G01G 23/18* (2013.01)

(58) Field of Classification Search
CPC .... B66F 9/0755; B66F 17/006; B66F 11/044; G01G 19/083; G01G 19/52; G01G 23/18
See application file for complete search history.

(56) References Cited

U.S. PATENT DOCUMENTS

| 4,043,415 A | * | 8/1977 | Luchinger | G01G 7/04 177/255 |
| 4,072,202 A | * | 2/1978 | Storace | G01G 3/08 177/229 |
| 4,107,985 A | * | 8/1978 | Sommer | G01G 3/08 73/862.633 |
| 4,128,001 A | * | 12/1978 | Marks | G01G 3/1412 177/211 |

(Continued)

FOREIGN PATENT DOCUMENTS

| EP | 3 199 486 A1 | * | 8/2017 | ............ B66F 11/044 |
| FR | 3 000 200 | * | 6/2014 | ............ G01G 21/23 |

OTHER PUBLICATIONS

Computer translation of FR3000200 from the EPO website, downloaded Apr. 10, 2019.*

(Continued)

*Primary Examiner* — Randy W Gibson
(74) *Attorney, Agent, or Firm* — Simmons Perrine Moyer Bergman PLC

(57) ABSTRACT

An AWP boom is coupled to a platform rotator through a novel load sensing linkage system which provides both structural support and load sensing capabilities of an attached platform support structure. The load sensing linkage system includes an upper flex plate and a lower flex plate and a single load cell for load sensing capabilities. The flex plates provide for stiffness in all directions except where necessary for load sensing.

12 Claims, 7 Drawing Sheets

(56) References Cited

U.S. PATENT DOCUMENTS

| | | | | | |
|---|---|---|---|---|---|
| 4,383,586 | A | * | 5/1983 | Lee | B23Q 1/36 177/229 |
| 4,433,742 | A | * | 2/1984 | Lee | G01G 21/244 177/229 |
| 4,488,611 | A | * | 12/1984 | Jacobson | G01G 3/1412 177/211 |
| 4,526,245 | A | * | 7/1985 | Ruf | G01G 21/244 177/160 |
| 4,561,512 | A | * | 12/1985 | Tramposch | G01G 23/02 177/211 |
| 4,655,306 | A | * | 4/1987 | Saner | G01G 3/1412 177/229 |
| 4,657,097 | A | * | 4/1987 | Griffen | G01L 1/2243 177/211 |
| 4,662,464 | A | * | 5/1987 | Nomura | G01G 21/24 177/229 |
| 4,679,642 | A | * | 7/1987 | Brock | G01G 3/08 177/164 |
| 4,942,529 | A | * | 7/1990 | Avitan | B66F 9/24 340/685 |
| 5,076,376 | A | * | 12/1991 | Bizet | G01G 3/1412 177/229 |
| 5,262,598 | A | * | 11/1993 | Stotler | G01G 13/06 177/116 |
| 5,293,007 | A | * | 3/1994 | Darst | G01L 1/2243 177/229 |
| 5,515,945 | A | | 5/1996 | Smith et al. | |
| 5,645,142 | A | | 7/1997 | Kraemer et al. | |
| 5,755,306 | A | | 5/1998 | Kraemer et al. | |
| 5,850,892 | A | | 12/1998 | Citron et al. | |
| 5,934,409 | A | | 8/1999 | Citron et al. | |
| 6,095,286 | A | | 8/2000 | Citron et al. | |
| 6,173,810 | B1 | | 1/2001 | Citron et al. | |
| 6,371,243 | B1 | | 4/2002 | Donaldson et al. | |
| 6,439,341 | B1 | | 8/2002 | Engvall et al. | |
| 6,517,225 | B1 | | 2/2003 | Allen et al. | |
| 6,585,079 | B1 | | 7/2003 | Weyer | |
| 6,607,285 | B2 | | 8/2003 | Citron et al. | |
| 7,198,278 | B2 | | 4/2007 | Donaldson | |
| 7,425,004 | B2 | | 9/2008 | Donaldson | |
| 7,832,741 | B2 | | 11/2010 | Donaldson | |
| 8,600,652 | B2 | * | 12/2013 | Mizutani | B66C 13/18 701/123 |
| 8,801,354 | B2 | | 8/2014 | Lettau | |
| 9,573,797 | B1 | * | 2/2017 | Beck | B66F 17/006 |
| 10,427,926 | B2 | * | 10/2019 | Mourlam | B60Q 9/00 |
| 2002/0144862 | A1 | | 10/2002 | Engvall et al. | |
| 2003/0174064 | A1 | * | 9/2003 | Igarashi | B66F 11/046 340/685 |
| 2014/0246270 | A1 | | 9/2014 | Parot et al. | |
| 2019/0195705 | A1 | | 6/2019 | Messenger et al. | |
| 2020/0003607 | A1 | * | 1/2020 | Bafile | B66C 23/90 |

OTHER PUBLICATIONS

Computer translation of EP3199486 from the EPO website, downloaded Apr. 10, 2019.*

* cited by examiner

FLEXIBLE PLATE SCALE FOR PLATFORM LOAD WEIGHING

CROSS REFERENCE TO RELATED APPLICATIONS

The present application claims the benefit of the filing date of provisional patent application having Ser. No. 62/385,353 filed on Sep. 9, 2016 by the same inventors, which application is incorporated herein in its entirety by this reference.

FIELD OF THE INVENTION

The present invention relates to improved systems and methods for working from an elevated location.

BACKGROUND OF THE INVENTION

The present invention relates generally to aerial work platforms (AWPs) and more particularly to AWPs and methods of constructing and utilizing the same.

More particularly, the present invention relates to systems and methods for accurately determining the weight of loads in a bucket or basket of an AWP. Many prior art AWP often failed to fully meet some of the industry needs. Often, baskets of AWPs require substantial rigidity to provide optimal utility and safety. However, prior art AWP (including U.S. Pat. No. 6,439,341) often used a four-bar linkage mechanism to support the load, with a diagonal member between two of the pivots acting as the force measuring point.

One disadvantage of the four-bar linkage is that the pivot bearings introduce non-linear slop as well as stiction effects that create hysteresis in the load measurement.

Consequently, there is a need for improved AWPs which provide useful rigidity and the ability to provide for load weight determinations over a wide range of weights with a high degree of precision.

SUMMARY OF THE INVENTION

It is an object of the present invention to provide a robust, low cost and compact system for measuring load weights in an AWP.

It is an advantage of the present invention to provide a load bearing linkage connection which is stiff in five degrees of freedom and very flexible in the sixth degree.

It is a feature of the present invention to include a sole pair of parallel steel load bearing plates for providing all of the load bearing connection between a platform support weldment and a platform rotator.

It is another advantage to include an economically, computationally and spatially efficient system for measuring the weight of the entire load on the AWP.

It is another feature of the present invention to provide a sole load cell.

It is another advantage of the present invention to give much more repeatable results in weighing the load, and simultaneously provide a more rigid connection to the boom.

The present invention is designed to achieve the above-mentioned objectives, include the previously stated features, and provide the aforementioned advantages.

The present invention is carried out in a multi-load cell less system in the sense that only a single load cell is used to determine the entire load in the AWP.

The present invention includes:

A system for measuring the weight of a load in a basket of an aerial work platform AWP, the system comprising:
 a. a boom disposed on an AWP;
 b. a platform support structure; configured to support a human being in an elevated work location;
 c. a load sensing linkage system disposed between said boom and said platform support structure; and
 d. said load sensing linkage system having:
  i. an upper flex plate and a lower flex plate, which in combination conduct all lifting forces from the boom to a load on the platform support structure; and
  ii. a load cell configured to make a weight determination of a load based upon flexing of one of said upper flex plate and said lower flex plate.

A method of protecting AWPs from overload operation comprising the steps of:
 a. providing a boom disposed on an AWP;
 b. providing a platform support structure; configured to support a human being in an elevated work location;
 c. providing a load sensing linkage system disposed between said boom and said platform support structure; and
 d. wherein said load sensing linkage system has:
  i. an upper flex plate and a lower flex plate, which in combination conduct all lifting forces from the boom to a load on the platform support structure; and
  ii. a load cell configured to make a weight determination of a load based upon flexing of one of said upper flex plate and said lower flex plate.
 e. slowly causing the boom to provide lifting forces to a load on the platform support structure; and
 f. monitoring an output of the load cell to determine if the lifting forces applied by the boom exceed a predetermined threshold.

DETAILED DESCRIPTION OF THE INVENTION

Figure 1:
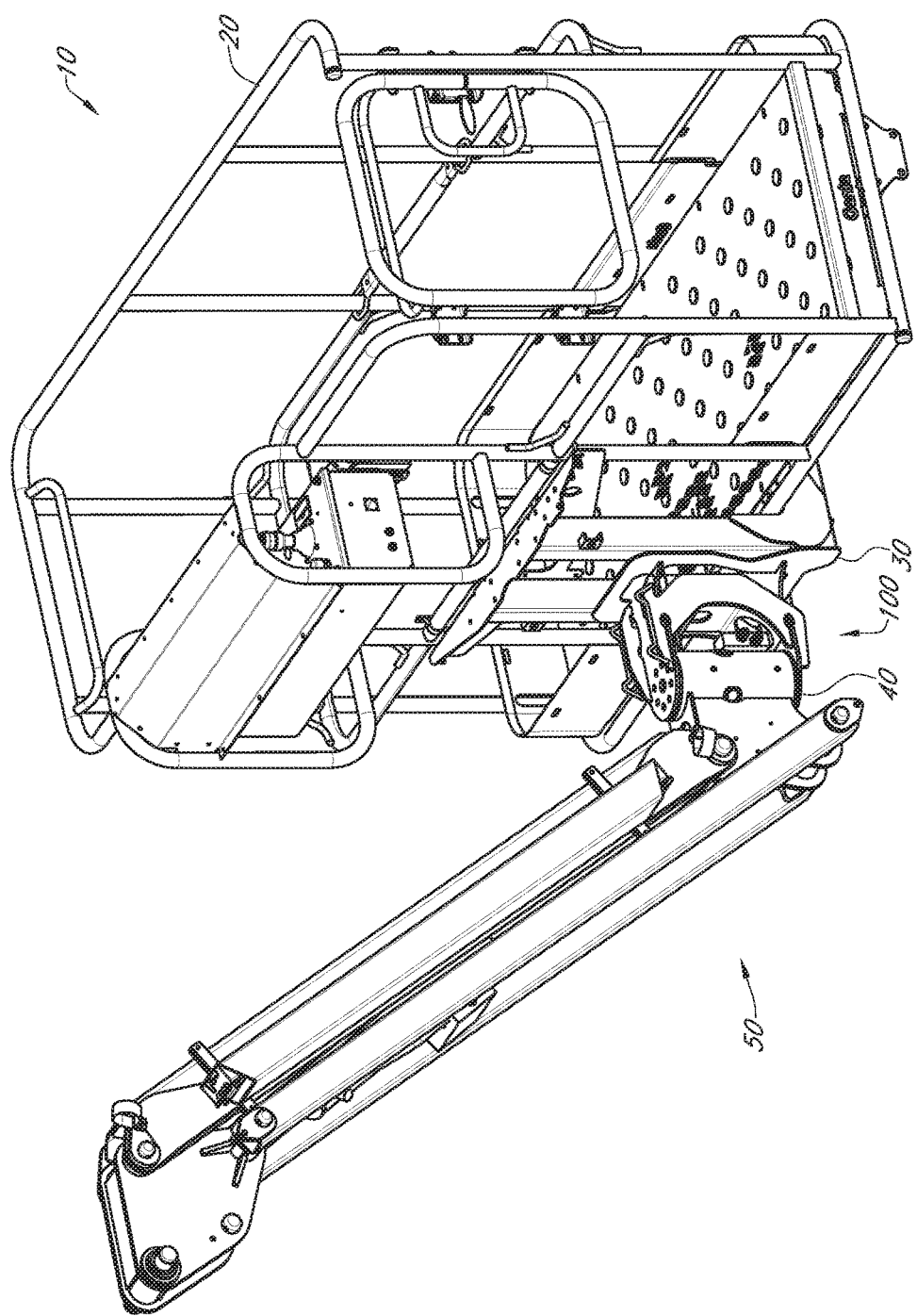
FIG. 1 is a perspective view of the present invention.

Now referring to the drawings wherein like numerals refer to like structure shown in the drawings and text included in the application throughout.

In FIG. 1, there is shown a basket 10 of an AWP with the three major substructures. A railing enclosure 20, which is similar to those which are well known in the art, which is attached to platform support structure 30, which is commonly used to provide support under a floor of a prior art bucket or basket. The innovative load sensing linkage system 100 is disposed between platform support structure 30 and platform rotator 40, which is coupled to boom 50.

Figure 2:
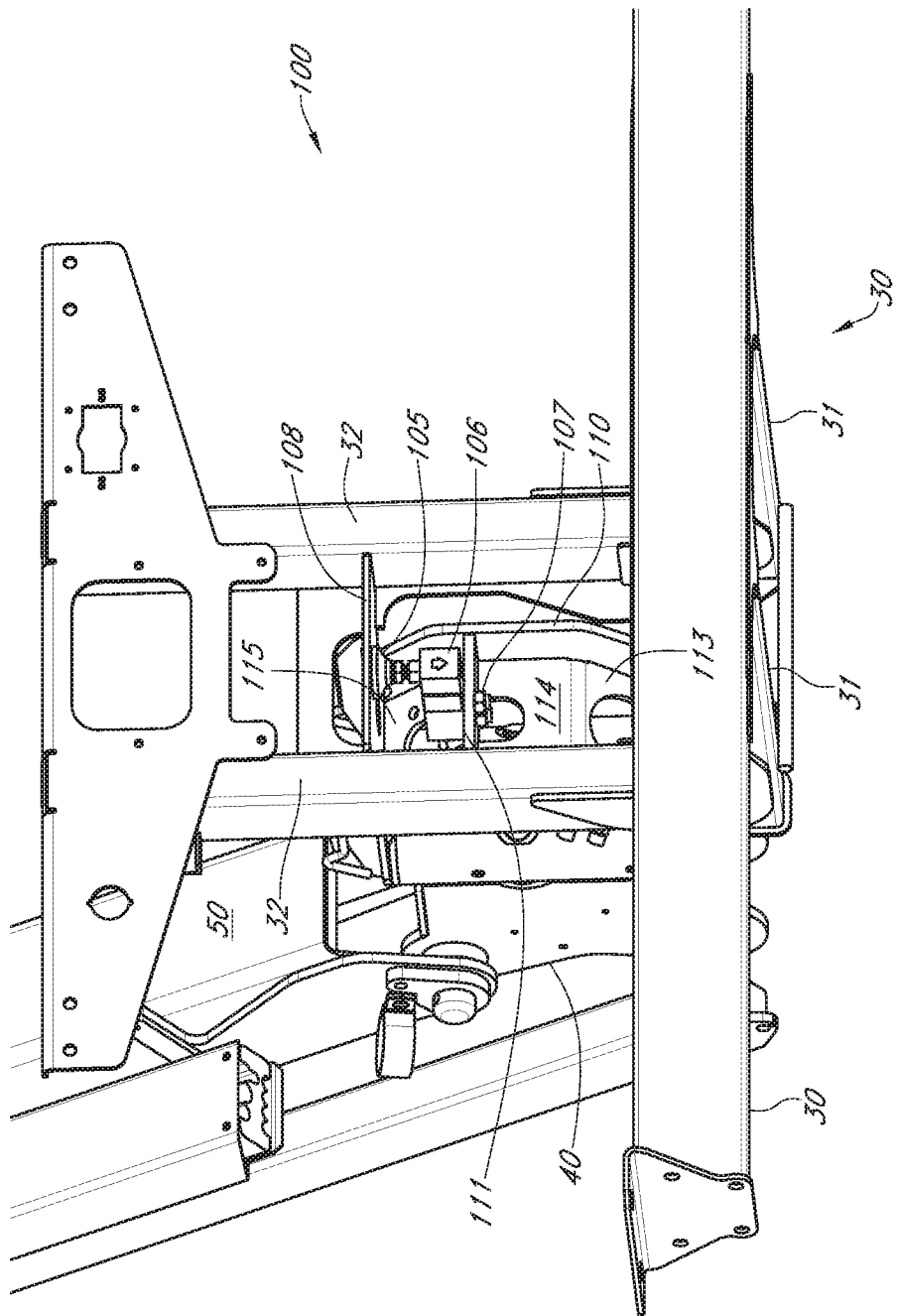
FIG. 2 is close up perspective load end view of a portion of the system of FIG. 1.
Figure 3:
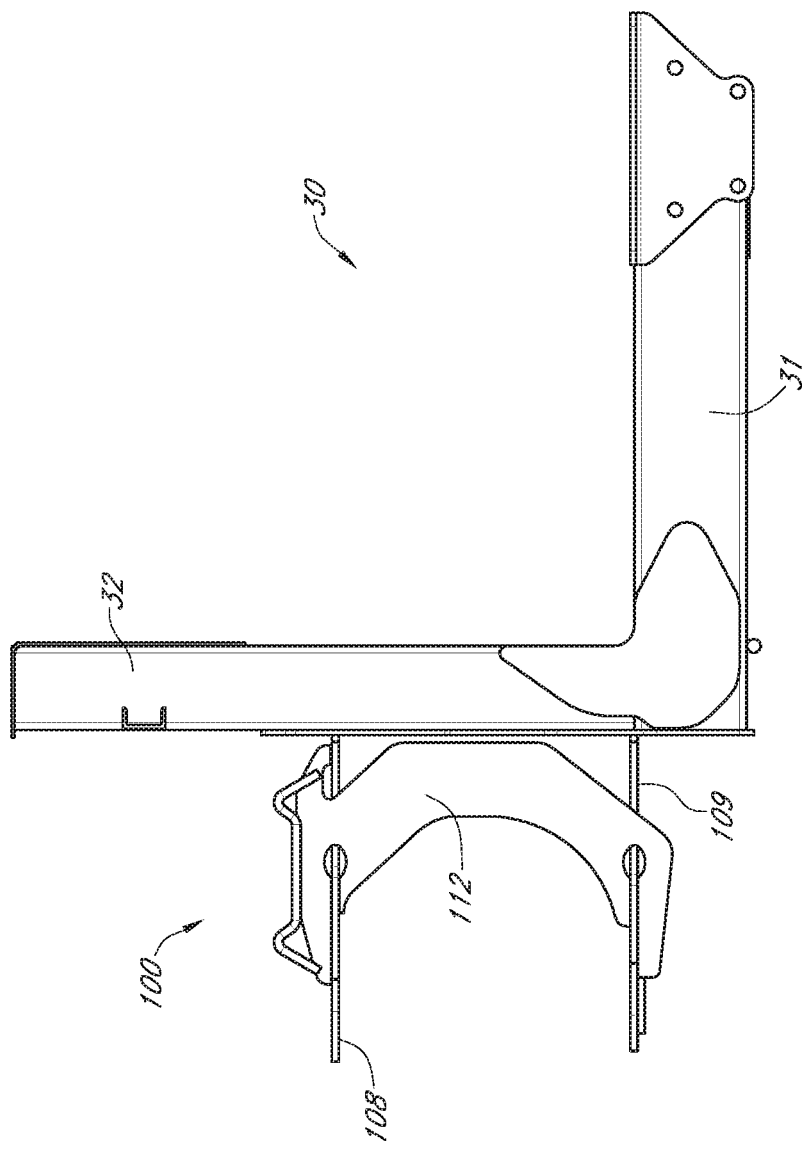
FIG. 3 is the side of a portion of the system of the present invention.

A better understanding of load sensing linkage system 100 can be obtained by now referring to FIG. 2, which shows a load end view with first C shaped linkage side 110 which is coupled to central load cell shelf 111 which is coupled to second C shaped linkage side 112 (FIG. 3). Load cell 106 is disposed on central load cell shelf 111 and is attached with load cell to support mounting bolts and nuts 107. Upwardly angled linkage face 113, vertical linkage face 114, and downwardly angled linkage face 115 also provide connection between first C shaped linkage side 110 and second C shaped linkage side 112.

Upper flex plate 108 and lower flex plate 109 are shown and are key elements in the load weight sensing capabilities of the present invention. When weight is added onto the basket 10, its weight is transferred to platform support forks 31 and platform support uprights 32, which are coupled to load sensing linkage system 100 through upper flex plate 108 and lower flex plate 109. When more weight is added to the basket 10, the upper flex plate 108 and lower flex plate 109 will flex, which applies pressure to load cell load transfer foot 105, which is coupled to load cell 106, which creates an electric signal corresponding to the weight of the load applied to basket 10. Because the load cell is much stiffer than the two flex plates in the vertical direction, the load cell supports nearly all of the vertical load. It should be noted that the flex plate structure is very rigid in the horizontal plane (fore/aft and left/right) and is also very rigid against torsional moments in three normal axes (Pitch, roll and yaw). The vertical stiffness comes almost entirely from the beam load cell itself, which is supporting the vertical load.

Now referring to FIG. 3, there is shown a side view of portions of the load sensing linkage system 100 in combination with the platform support structure 30. The important separation between second C shaped linkage side 112 and platform support uprights 32 is clearly shown.

Figure 4:
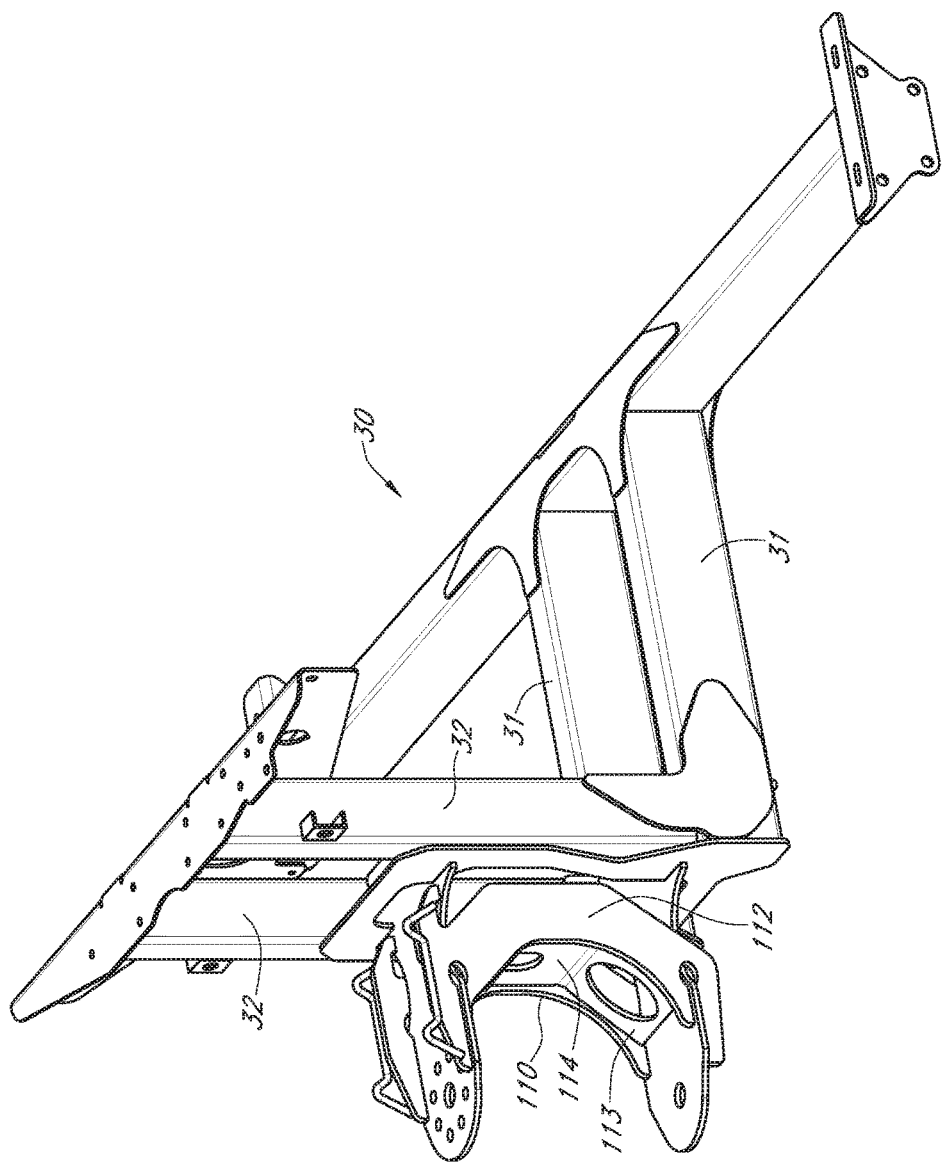
FIG. 4 is a perspective view of a portion of the present invention.

Now referring to FIG. 4, there is shown a perspective view of portions of the load sensing linkage system 100 in relation to platform support structure 30.

Figure 5:
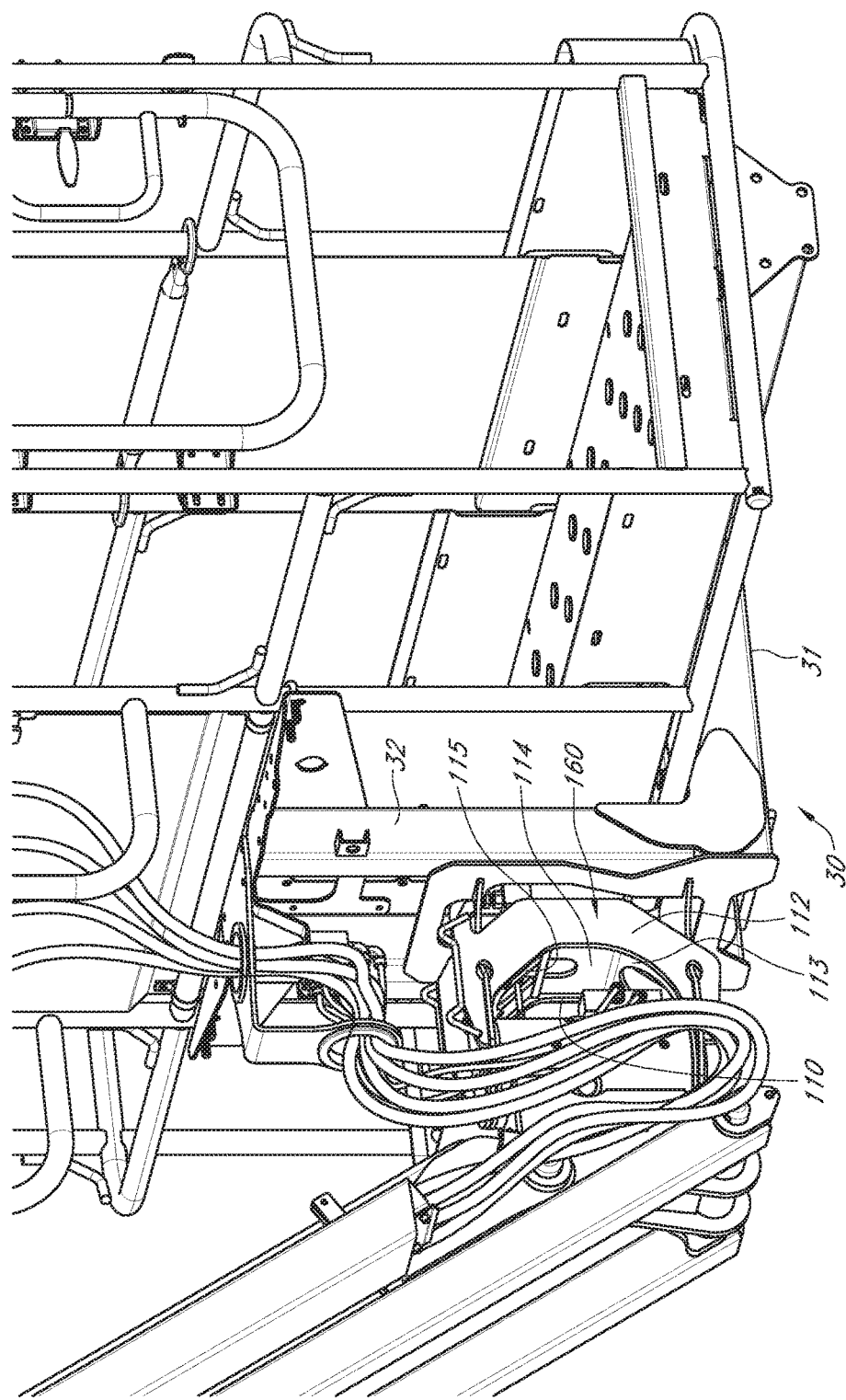
FIG. 5 is the perspective boom end view of the present invention in a fully assembled state.

Now referring to FIG. 5, there is shown a completed assembly of the present invention including: downwardly angled linkage face 115.

Figure 6:
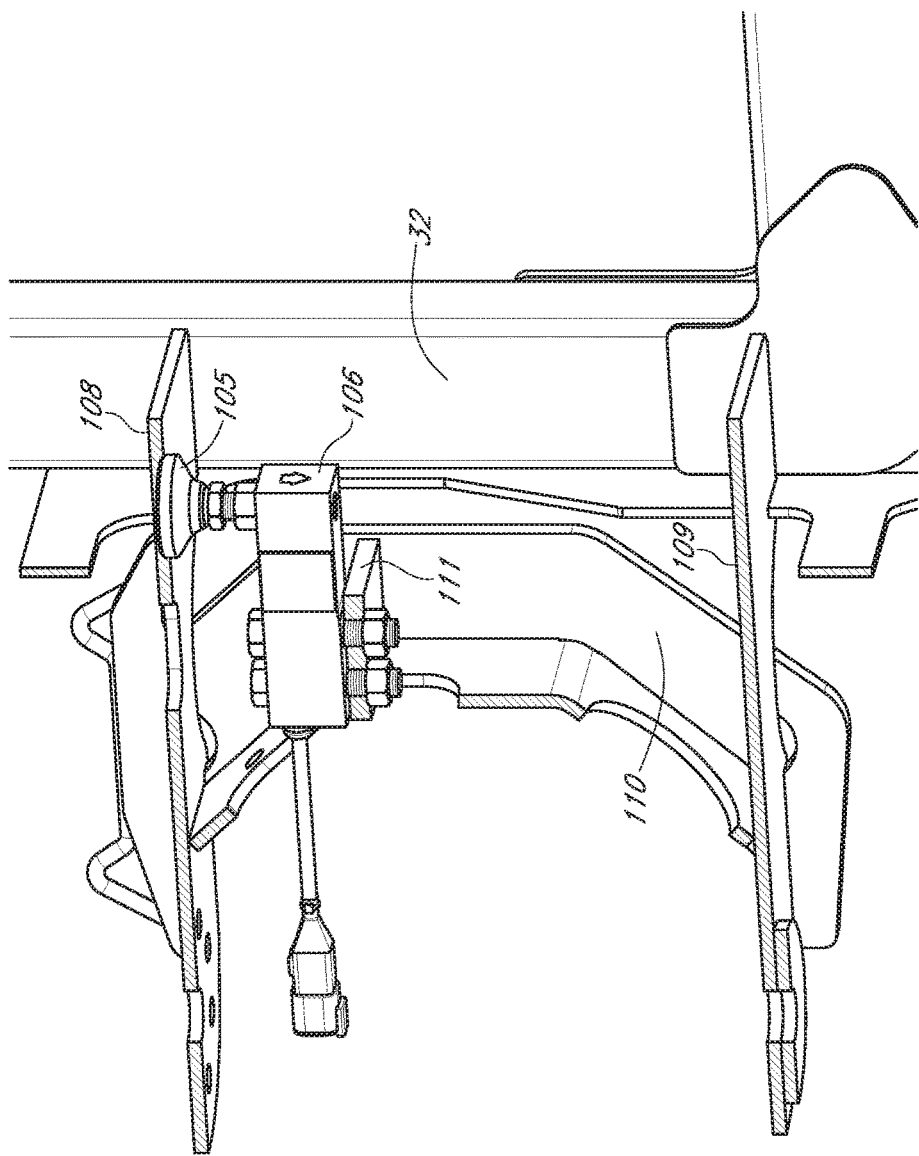
FIG. 6 is a close up perspective load end view of a portion of the present invention which has been cut to reveal portions which would otherwise be difficult to see.

Now referring to FIG. 6, there is shown a view of the present invention with a partial cut-away to reveal otherwise concealed portions. Portions of the following pieces have been literally cut-away: second C shaped linkage side 112 (all of it removed) central load cell shelf 111, upwardly angled linkage face 113, vertical linkage face 114, downwardly angled linkage face 115, upper flex plate 108 and lower flex plate 109. The flex plates 108 and 109 are the only part of the weldment that connects to the platform support structure 30. However, the load cell beam is also supporting the platform support structure and is much stiffer than the flex plates. This results in the load cell 106 supporting only the vertical component of the platform since the horizontal and rotational components are handled stiffly by the flex plates.

Figure 7:
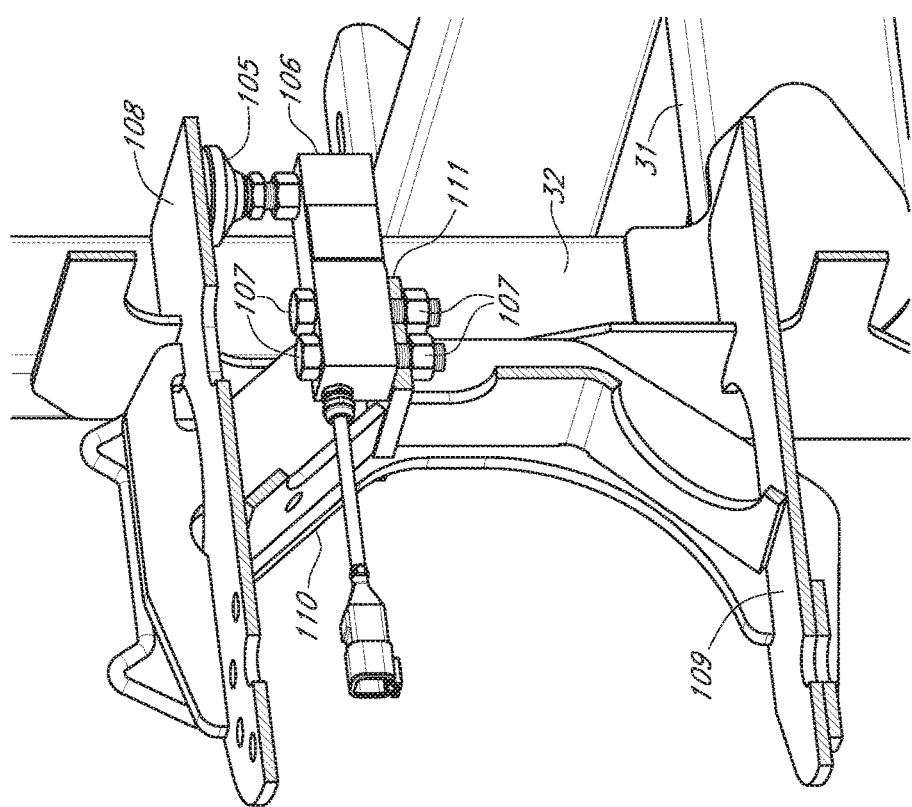
FIG. 7 is a close up perspective boom end view of a portion of the present invention which has been cut to reveal portions which would otherwise be difficult to see.

FIG. 7 shows the apparatus of FIG. 6 but taken from a vantage point on the boom side.

Now referring to FIGS. 1-7, the present invention functions as follows; when weight is added to basket 10, upper flex plate 108 flexes and load cell load transfer foot 105 transfers the force to load cell 106, which outputs an electrical signal corresponding to the added weight.

The method of the present invention can be as follows:

Detection of an overload condition before lifting, of an overloaded basket occurs as follows: the boom 50 is caused to apply lifting forces to the load; as more and more lifting forces are applied less of the load is being supported directly by the ground and more of the load is being transmitted through load sensing linkage system 100 and upper flex plate 108 flexes more and the output of load cell 106 increases. Assuming that the lifting forces are increased slowly and that the load is substantially excessive then: the load cell 106 will determine this before the load is lifted. This process could be programmed into the control system so that on start up this sequence is performed automatically to require the operator to unload excessive weight before lifting the basket 10.

The present invention has been described as relating to AWPs. It should be understood that the invention could be applicable to including but not limited to: fork lifts, robotic arms, or any other mechanism where a load is placed at the end of a movable lifting mechanism. Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

It is thought that the method and apparatus of the present invention will be understood from the foregoing description, and that it will be apparent that various changes may be made in the form, construct steps, and arrangement of the parts and steps thereof, without departing from the spirit and scope of the invention, or sacrificing all of their material advantages. The form herein described is merely a preferred exemplary embodiment thereof.

We claim:

1. A system for measuring a weight of a load in a basket of an aerial work platform (AWP), the system comprising:
   a. a boom disposed on an AWP;
   b. a platform support structure; configured to support a human being in an elevated work location;
   c. a load sensing linkage system disposed between said boom and said platform support structure; and
   d. said load sensing linkage system having:
      i. an upper flex plate, having a boom end and an opposing platform support structure end, which is welded to the platform support structure, and a lower flex plate, which in combination conduct all lifting forces from the boom to a load on the platform support structure;
      ii. a load cell configured to make a weight determination of a load based upon flexing of one of said upper flex plate and said lower flex plate; and
      iii. the load cell has a top side disposed beneath and in contact with a bottom side of the upper flex plate.

2. The system of claim 1 wherein said load cell is a sole load cell in said load sensing linkage system.

3. The system of claim 2 wherein said one of said upper flex plate and lower flex plate is said upper flex plate.

4. A system for measuring the weight of a load in a basket of an aerial work platform (AWP), the system comprising:
   a. a boom disposed on an AWP;
   b. a platform support structure; configured to support a human being in an elevated work location;
   c. a load sensing linkage system disposed between said boom and said platform support structure; and
   d. said load sensing linkage system having:

i. a right C shaped linkage side and a left C shaped linkage side with a central load cell shelf disposed laterally therebetween;

ii. an upper flex plate, having a boom end and an opposing platform support structure end, which is welded to the platform support structure, and a lower flex plate, which in combination conduct all lifting forces from the boom to a load on the platform support structure;

iii. a load cell configured to make a weight determination of a load based upon flexing of one of said upper flex plate and said lower flex plate; and iv. the load cell has a top side disposed beneath and in contact with a bottom side of the upper flex plate.

5. The system of claim 4 wherein said load cell is disposed on said central load cell shelf.

6. The system of claim 5 wherein a stiffness characteristic of the least stiff of six degrees of freedom of the platform support structure is a vertical stiffness.

7. A method of protecting AWPs from overload operation comprising the steps of:

a. providing a boom disposed on an AWP;

b. providing a platform support structure; configured to support a human being in an elevated work location;

c. providing a load sensing linkage system disposed between said boom and said platform support structure; and d. wherein said load sensing linkage system has:

i. an upper flex plate, having a boom end and an opposing platform support structure end, which is welded to the platform support structure, and a lower flex plate, which in combination conduct all lifting forces from the boom to a load on the platform support structure;

ii. a load cell configured to make a weight determination of a load based upon flexing of one of said upper flex plate and said lower flex plate; and iii. the load cell has a top side disposed beneath and in contact with a bottom side of the upper flex plate; and e. slowly causing the boom to provide lifting forces to a load on the platform support structure; and f. monitoring an output of the load cell to determine if the lifting forces applied by the boom exceed a predetermined threshold.

8. The method of claim 7 further comprising the steps of:

a. generating a signal when said predetermined threshold is exceeded; and b. using said signal to affect further provisioning of lifting forces.

9. The method of claim 8 wherein said step of using said signal comprise termination of further provisioning of lifting forces.

10. The method of claim 9 further comprising generating an audible alert indicating that the basket is overloaded.

11. The method of claim 7 further comprising a platform rotator disposed on a distal end of the boom.

12. The method of claim 7 wherein said load cell is not configured to conduct all horizontal forces to said load.

* * * * *